Feb. 3, 1970

D. C. LEWIS 3,493,910

HOT WIRE TYPE SPRING MOTOR ACTUATOR FOR SWITCHES

Filed Dec. 16, 1966

DWIGHT C. LEWIS INVENTOR.

BY *A. J. De Angelis*
ATTORNEY

United States Patent Office

3,493,910
Patented Feb. 3, 1970

3,493,910
HOT WIRE TYPE SPRING MOTOR ACTUATOR FOR SWITCHES
Dwight C. Lewis, Elkhart, Ind., assignor to Penn Controls, Inc., Wheaton, Ill., a corporation of Delaware
Filed Dec. 16, 1966, Ser. No. 602,245
Int. Cl. H01h 61/00, 71/18, 37/46
U.S. Cl. 337—126                                    7 Claims

ABSTRACT OF THE DISCLOSURE

An electro-thermo-mechanical transducer for sequentially actuating electrical switches. A pivoted beam is urged in one direction by a spring but is restrained by several lengths of tensioned stainless steel wire against such movement; the wire lengths being electrically interconnected in series. The wire lengths expand and contract in response to heating by current flow causing the beam to move and sequentially actuate switches positioned along its length. The wire lengths are stretched to slightly beyond their yield points prior to anchoring to the beam in order to equalize their lengths and the tension therein to provide equal expansion and contraction of all the wire lengths in unison. The switches are equally spaced on either side of the beam pivot and selected such that loading of the beam by their spring forces is substantially equalized to zero. The switches are torsion type with the point of contact of each switch lever with the beam positioned so as to maintain a force-distance relationship for all the switches which provides a constant differential for all switches.

---

The invention relates to hot wire spring motor actuators and especially to such actuators adapted for sequential switching and to those of multi-wrapped construction.

A hot wire type spring motor actuator comprises a wire which is tensioned against the force of a mechanical spring. Usually the spring is prestressed to a certain potential energy level and then connected to the wire in such a manner as to tend to stretch it. The wire is made of a material having relatively high ohmic resistance and coefficient of expansion characteristics. Controlled amounts of electrical energy are selectively fed through the wire, causing it to heat. Such heating effects rapid expansion of the wire length, releasing the potential energy stored in the spring in an amount proportional to such expansion. The potential energy of the spring is thus converted to kinetic energy in proportion to the electrical energy signal input to the wire. Such kinetic energy may be used to actuate other mechanisms.

Conversely, cooling and the consequent contraction of the wire in response to a decrease in electrical energy input to the wire restresses the spring to store energy therein. The mechanical movement due to such contraction may also be used to actuate other mechanisms. As an example of such an actuator, see the U.S. Patent No. 2,926,293.

It is desirable to provide such an electro-thermo-mechanical transducer which is highly reliable and very fast-acting, yields substantial mechanical force and is of simple and economical construction.

It is, therefore, an object of the invention to provide an improved electro-thermo-mechanical transducer.

The invention involves providing a hot wire type spring motor actuator for switches which is of multi-wrap hot wire construction. The hot wire actuator also utilizes a hot wire structure which provides for equal expansion and contraction of all the wire lengths of the multi-wrap; the wires being connected mechanically in parallel and in series electrically. In addition, the actuator construction is such that minimal loading of the hot wire by the switches occurs, and the force required to actuate individual switches is minimized.

In carrying out the invention, according to a preferred embodiment, a heat resistant wire, such as stainless steel annealed wire type 316 ASTM is looped twice over two spaced apart bobbins of electrical insulating material. The bobbins are then moved apart relative to each other until each and every length of wire is stretched slightly beyond its yield point. This stretching equalizes the tension in each wire and equalizes their lengths with respect to each other. The wire is cemented to the bobbins at its points of contact therewith. One bobbin is then placed at the end of a beam which is fulcrumed at its mid-point. The other bobbin is fastened to a structure which is stationary with respect to the beam. A spring, under compression, is placed in position to bias the beam to maintain the wires in tension.

A plurality of switches to be actuated by movement of the beam are spaced along the beam length in position for actuation thereby; and equal number being positioned on either side of the beam fulcrum. These switches are of a "snap action" type, equipped with a torsion lever for actuation. Adjustable screws are placed along the actuator beam, one for each of the switches in position to actuate the torsion lever of its respective switch. The point of contact between each adjustable screw and the switch torsion lever is selected so that the force-distance relationship for all of the switches is the same. An external spring biases each switch lever against its associated adjustable screw to maintain contact therebetween throughout the stroke of the heat motor beam. The switches on one side of the fulcrum are biased to normally opened, while those on the other side are biased to normally closed to provide equal loading of the heat motor beam. With such an arrangement, loading of the beam by the actuated devices (the switches) is minimized, and the force required to actuate each individual switch is minimized. The multi-wrap construction provides for a relatively large actuating force, and because of the cemented plural strands yields failsafe operation of the control under conditions where a strand is broken.

Features and advantages of the invention will be seen from the above and from the following description when considered in conjunction with the drawing and from the appended claims.

Figure 4:
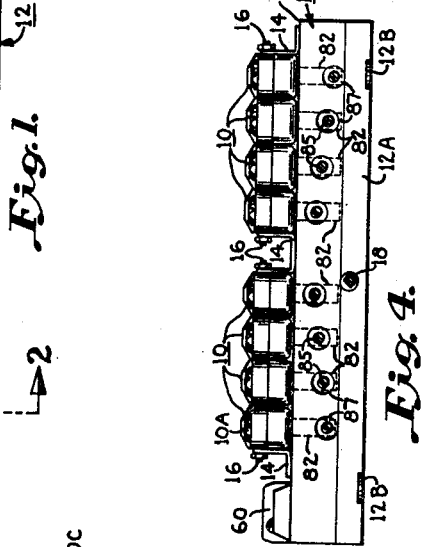
FIGURE 4 is a greatly reduced side elevational view of the actuator of FIG. 1, with the bottom cover in place.

In the drawings, for convenience, the actuator is shown adapted for sequentially operating eight snap action type switches generally designated 10. The switches are mounted in side-by-side relationship in two groups of four switches each on the top exterior surface of a rectangular box-like actuator housing 12 (FIG. 4). Switches 10 are held in place by means of brackets 14 affixed to and extending from housing 12; a fastener 16 extending through each set of switches 10 and its associated brackets 14.

Actuator housing 12 is equipped with a removable bottom cover 12A (FIGS. 2 and 4) fastened onto the housing by means of two screws 18. Cover 12A is provided with four laterally extending mounting lugs 12B for fastening the actuator to a supporting structure, as desired.

Within housing 12, a longitudinally extending beam 20 is pivoted at its midpoint on a shaft 24 which is supported at its ends by a triangular shaped flat plate 28 and the top wall 12C of the housing. Shaft 24 is secured to plate 28 by a fastener 30, while the plate, in turn, is fastened to housing 12 by three mounting screws 32, extending through the three corners of the triangular plate 28 and threaded into the top wall 12C of housing 12. Spacers 34 encircle each screw 32 to maintain plate 28, spaced from the top wall 12C, allowing limited pivoting movement of beam 20 in the clockwise and counterclockwise directions.

Figure 2:
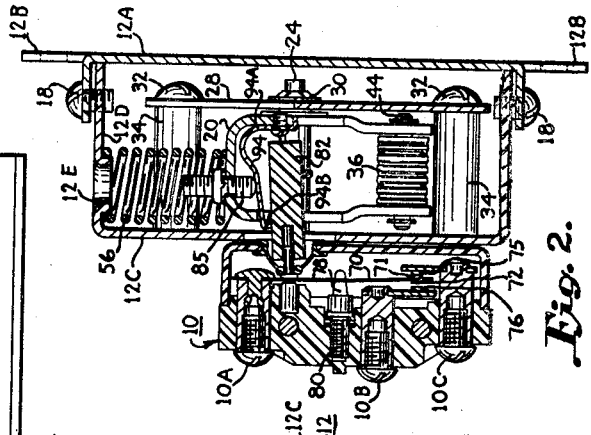
FIGURE 2 is a cross-sectional view taken along the line 2—2 of FIG. 1, with the bottom cover in plate.

Beam 20, as can be seen in FIG. 2, is of substantially inverted U cross-sectional shape and is provided at its right hand end (FIG. 1) with a laterally extending portion 20A for carrying a bobbin 36. Bobbin 36 is one of a pair of bobbins 36, 37 composed of electrically insulating material and which bobbins prior to final assembly are first mounted in a jig, (not shown) a predetermined distance apart, one from the other. Stainless steel wire 38 (type 316 ASTM) of a predetermined relatively high ohmic value and coefficient of expansion characteristics, is then wrapped over the spaced apart bobbins 36, 37 to form four wire lengths extending between bobbins; one end, 38A of wire 38 being first looped twice around bobbin 37 on the left, thence passed to, over and twice around bobbin 38 at the right, thence back to bobbin 36 where it is again passed over and twice around the bobbin, and thence finally back to left hand bobbin 37, passing over that bobbin twice before terminating in a wire end 38B.

It may be noted, that bobbins 36 and 37 are each provided with peripheral grooves to receive the turns of wire 38 and to prevent electrical shorting of the wire lengths with each other, thereby providing four lengths of wire extending between the bobbins which lengths are all electrically interconnected in series with each other.

Bobbins 36, 37 are next stretched further apart with respect to each other, until each one of the four wires running between the bobbins elongates sufficiently to slightly exceed its respective yield point, thereby equalizing the tension applied to and the length of each wire with that of the other wires. This places the four wires mechanically in parallel with each other, so that they share the applied load equally. Wire 38 is next cemented to the bobbins at its points of contact therewith.

Figure 3:
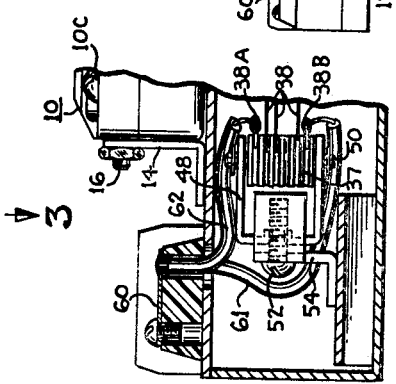
FIGURE 3 is a fragmentary, sectional view taken along the line 3—3 of FIGURE 1.

While wire 38 is maintained under tension, bobbin 36 is affixed (FIGS. 1, 2) to the extending portion 20A of beam 20 by means of a fastener 44, which passes axially through the bobbin and the flanges of beam portion 20A. Bobbin 37 is nested within a U-shaped bracket 48 (FIGS. 1, 3) and is secured thereto by an axially extending fastener 50. Bracket 48 carrying bobbin 37 is then adjustably mounted to actuator framework 12 in position to maintain wire 38 under tension. Such adjustable mounting is effected by an adjustable screw 52, extending through a mounting bracket 54 of actuator housing 12, and threaded into the interconnecting web of U-shaped bracket 48 carrying the bobbin. Screw 52 may thus be threaded in and out to vary slightly the distance between bobbins 36 and 37.

A coil spring 56 under compression is placed between a side wall 12D of actuator housing 12 and beam 20 in position to bias the beam counter-clockwise (FIG. 1) to maintain the tension in the multi-strands of hot wire 38. An annular lip 12E (FIG. 2) formed in wall 12D protrudes in position to be encircled by the upper end of coil spring 56, retaining the spring in position. Bobbins 36, 37 are next released from their jig (not shown) allowing the force of spring 56 to be applied through beam 20 to wire 38, maintaining the multi-strand hot wire in tension.

It is seen that with the subject arrangement, the four lengths of the hot wire 38 are connected electrically in series and mechanically in parallel, thereby sharing equally the applied force stored in compression spring 56 to expand and contract equally and in unison.

Figure 1:
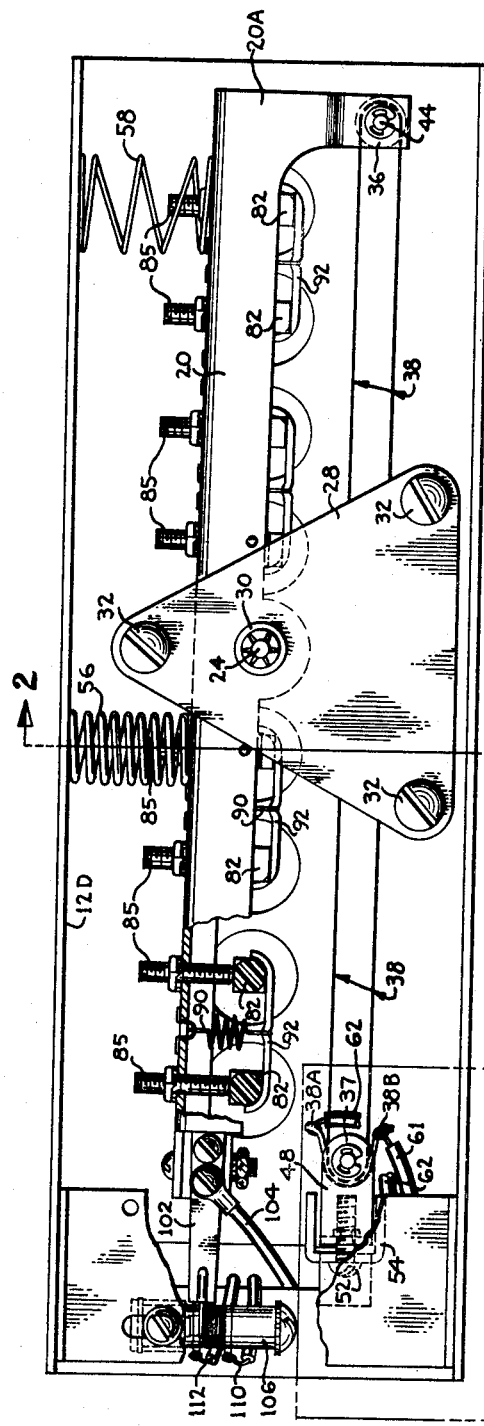
FIGURE 1 is a simplified, fragmentary diagrammatic representation of a hot wire type spring motor actuator with bottom cover removed and embodying the invention.

A second compression spring 58 is placed between the side wall 12D of actuator housing 12 and the right hand end of beam 20 (FIG. 1). Spring 58 is selected of a relatively small compressive force and is used merely to maintain beam 20 in pivoting contact with its shaft 24 at the same point throughout its stroke.

A terminal srtip 60 of electrical insulating material is fastened to the upper exterior wall 12C of actuator housing 12 for electrically interconnecting the internal circuitry of the actuator to external circuitry (not shown) as desired; the ends 38A, 38B of hot wire 38 being connected by electrical leads 61, 62 to terminal strip 60.

Switches 10 are of the snap action type disclosed in U.S. Patent 3,255,639 issued to G. M. Russell. These switches are equipped as in the embodiment of FIG. 1 of such patent and are illustrated in FIG. 2 hereof as comprising a cantilevered leaf spring 70 having a pair of oppositely disposed moveable contacts 71, 72 mounted on its end in position for co-action with associated stationary contacts 75, 76. Leaf spring 70 is partially slit (not shown) longitudinally and is compressed laterally intermediate its ends by a U-shaped bracket or clamp 78; the amount of compression being adjustable by means of a screw 80 which urges the arms of the U bracket towards each other to compress the leaf spring. Such compression causes leaf spring 70 to buckle into either of one of two switching positions, closing contacts 71, 75 or 72, 76, as desired. A toggle or torsion lever 82 is attached to leaf spring 70 through a hole formed in the leaf spring at a point between the U-shaped compressing bracket 78 and its fastened end. Torsional actuation of lever 82 causes snap actuation of the switch from one switching position to the other.

The torsion levers 82 of the switches extend down through the housing wall 12C into position to be engaged by associated adjustable actuating screws 85 carried by beam 20. An aperature 87 is provided in the actuator housing 12 for each of the adjusting screws for ease of adjustment of the screws from the exterior of the housing. A coil spring 90 is provided for each pair of adjusting screws 85 and is connected at one end to the mid-section of a yoke 92 which embraces the torsion levers 82 associated with its pair of screws 85. The other end of each spring 90, is secured to beam 20, placing each spring in tension to maintain the torsion levers 82 against the ends of their respective screw 85 throughout movement of actuator beam 20.

As may be seen in FIG. 4 where torsion levers 82 are indicated in phantom, each of the adjusting screws 85 is threaded through beam 20 in position to engage the torsion lever 82 of its associated switch in accordance with the distance of its switch from the fulcrum of beam 20 so as to maintain a predetermined force-distance relationship for all of the switches. This maintains a constant differential between the operate and release points for all of the switches. This is accomplished by staggering adjusting screws 85 so that their respective points of contact with associated torsion levers 82 are such that all the torsion levers 82 move through the same angular distance for each angular displacement of beam 20. For example, assume that beam 20 is moved clockwise (FIG. 1), 2° causing the screw 85 and yoke 92 at the extreme left of the beam to move its associated torsion lever 82 through a 1° arc upward. Assuming that the point of contact between the next adjacent adjusting screw 85 to to the right and its torsion lever 82 is properly selected in proportion to its distance from the first screw and toward the fulcrum of beam 20, such next adjacent torsion lever 82 is also actuated through a 1° arc upward. Thus, by staggering the point of contact inward for each next adjacent torsion lever 82 in progessing toward the beam fulcrum all the torsion levers move through the same arcuate distance in following angular movement of beam 20. For the two switches immediately adjacent to the fulcrum of beam 20 (on either side thereof) to obtain the proper point of contact it is necessary to provide an arcuate member 94 (FIG. 2) attached to the beam 20 at one end 94A and having a depending foot 94B in contact with its associated torsion lever 82. Arcuate member 94 enables the point of contact of adjusting screw 85 associated with its switch to be applied out side of the periphery of beam 20 where required to maintain the desired force-distance relationship for the switches nearest to the beam fulcrum.

Adjustable actuating screws 85 are threaded in and out to provide a predetermined amount of lost motion for each of the torsion levers 82 through which the levers must move before they can operate their respective switches. In this manner, any desired sequence of switch operation in response to movement of beam 20 may be preset. In the embodiment shown, screws 85 are adjusted to operate the switches in sequence from left to right (FIG. 2) from the left end of beam 20 to the right end. After adjustment, screws 85 are locked into position by a dab of cement.

In order to minimze loading of beam 20 by the internal biasing spring forces of the switches, those on the left side of the fulcrum of the beam are selected of a bias to aid counterclockwise movement of beam 20 (FIG. 2) in closing their respective contacts, while the switches on the right hand side of the fulcrum are biased against counter-clockwise movement in closing their respective contacts. In this manner, as beam 20 is actuated counterclockwise, the forces exerted on the beam 20 by the bias of each of the switches against actuation of their levers equalizes, tending to balance the angular forces acting on the beam to zero. Conversely, clockwise movement of beam 20 to release the switches in reverse sequence is resisted by the bias of the switches on the left hand side of the fulcrum (FIG. 2) to remain in closed condition, while it is aided by the bias of switches on the right hand side of the fulcrum, thereby equalizing the angular forces they exert on beam 20 to substantially zero.

Switches 10 are provided with screw connections 10A, 10B, 10C for connection of the switch contacts in external electrical circuitry, as may be desired, as for instance to control individual electrical heating circuits.

A potentiometer arm 102 is insulatedly mounted on the left hand end of beam 20 and is connected by wire 104 to terminal strip 60. Arm 102 extends into position to wipe across a potentiometer 106 mounted on actuator framework 12 and is electrically interconnected by leads 110 and 112 to terminal strip 60 for connection to external circuitry. In this manner, the potential at arm 102 directly indicates the position of beam 20 and, in turn, the switching condition of the switches 10.

As was previously explained, the passing of electrical current through the multi-strands of hot wire 38 in series causes the wires to heat and expand in proportion to the current passed therethrough. The strands of wire 38 all expand in unison and equally, thereby sharing the load equally and allowing compression sprng 56 to actuate beam 20 counter-clockwise. Such movement operates switches 10 in sequence proportional to the amount of counter-clockwise movement. Conversely, as current through hot wire 38 decreases and it cools, the wires all contract in unison equally, exerting substantial force to move beam 20 clockwise against the force of spring 56, thereby releasing switches 10 in proportion to such movement.

It may be noted that should a strand of hot wire 38 break, the electrical circuit through the hot wire becomes opened, causing the wire to cool. The remaining strands of wire in cooling contract and being cemented to the bobbins, exert sufficient force to actuate beam 20 clockwise and return the switches to their released positions, thereby tending to "fail-safe."

As changes can be made in the above described construction and many apparently different embodiments of this invention can be made thereof, it is intended that all matter contained in the above description or shown on the accompanying drawing be interpreted as illustrative only and not in a limiting sense.

What is claimed is:

1. The method of constructing a hot wire type spring motor actuator of multi-turn construction comprising,
   attaching at least two lengths of a metallic wire having a relatively high electrical resistance and a relatively high coefficient of expansion between two spaced apart support members movable with respect to each other to tension said wire lengths,
   moving said support members with respect to each other to stretch each wire length slightly beyond its yield point sufficiently to equalize said lengths of wire running between said support members and the tension in each for equal expansion and contraction of the wire lengths,
   placing a spring in position to exert force on one of said support members to maintain said wire lengths in tension, and
   connecting said wire lengths electrically in series with each other for energization from an electric current source to effect heating thereof and proportionate expansion and contraction of said wire lengths in unison to actuate said support members relative to each other.

2. The method of constructing a hot wire type spring motor actuator of multi-turn construction comprising,
   mounting two bobbins a predetermined distance apart,
   passing a metallic wire having a relatively high electrical resistance and a relatively high coefficient of expansion insulatedly around said spread apart bobbins to form at least two wire lengths extending between the bobbins,
   stretching the wire lengths by moving the bobbins apart with respect to each other to stretch each wire length slightly beyond its yield point and sufficiently to equalize the lengths of the wires running between the bobbins and the tension in each for equal expansion and contraction of each wire length,
   anchoring said metallic wire where it passes over said bobbins,
   placing a spring in position to exert force on at least one of said bobbins to maintain the wires in tension,
   releasing the bobbins against the tension of said spring to permit relative movement of said bobbins with respect to one another in response to expansion and contraction of said tensioned wire lengths, and
   connecting said wire lengths electrically in series for energization from an electric current source to effect heating thereof and proportionate expansion and contraction in unison to actuate said bobbins.

3. The method set forth in claim 2 wherein there is provided the additional steps of:
   mounting a longitudinally extending beam onto a pivot,
   placing of said spring in position to urge said beam in a given direction about its pivot, and
   placing of one of said bobbins, after said stretching step, onto said beam in position to cause said tensioned wires to oppose movement of said beam by said spring.

4. A hot wire type spring motor actuator including,
   a frame,
   a first support member movably mounted on said frame,
   a second support member fixed to said frame,
   a spring urging said first member in a certain direction with respect to said frame,
   at least two strands of metallic wire of substantially equal length and having a relatively high electrical resistance and a high coefficient of expansion, said strands being each attached at one of their respective ends to said first support member and at the other of their respective ends to second support member under tension to restrain said spring against actuating said first member, means for connecting said wires in series in an electrical energizing circuit for passing current therethrough to cause current flow to heat said wires sufficiently to expand them in proportion to power flow therethrough to release the stored spring energy to actuate said first member and in contracting on cooling to actuate said first member in a direction opposite to said certain direction, characterized in that, said wire strands are stressed beyond their respective yield points sufficiently to equalize their lengths and the tension in each of said wire strands by said spring.

5. A hot wire type spring motor actuator including, a pivotably mounted beam, a spring urging said beam in a certain direction about its pivot, a support member stationary relative to said beam, at least two strands of metallic wire of substantially equal length and having a relatively high electrical resistance and a high coefficient of expansion, said strands being each attached at one of their respective ends to said beam and at the other of their respective ends to said support member under tension to restrain said spring against actuating said beam, means for connecting said wires in series in an electrical energizing circuit for passing current therethrough to cause current flow to heat said wires sufficiently to expand them in proportion to power flow therethrough to release the stored spring energy to actuate said beam and in contracting on cooling to actuate said beam in a direction opposite to said certain direction, characterized in that, said wire strands are stresed beyond their respective yield points sufficiently to equalize their lengths and the tension in each of said wire strands due to said spring.

6. The actuator set forth in claim 5, wherein at least two electrical switches are positioned along the beam length, and wherein a plurality of adjusting screws are provided, one for each of said switches in position to actuate its respective switch, characterized in that, said switches are of the torsion lever type and said adjusting screws are staggered on said beam so as each to engage its respective torsion lever at a point providing a certain same force-distance relationship for all said switches to maintain the differential of all said switches constant by providing the same angular displacement of the torsion levers of all the switches for any given angular movement of said beam, and wherein means bias said torsion levers against their respective adjusting screws throughout movement of the beam, and each said adjusting screws being threaded in and out transverse to the beam axis to provide a certain lost motion of its associated torsion lever to proivde sequential switching of the switches in response to beam movement.

7. The actuator set forth in claim 6, wherein said switches are disposed on opposite sides of the beam fulcrum and equal distances therefrom and are selected of respective spring biases for acting on the beam in opposite angular directions substantially equalizing angular loading of the beam by the switches to zero.

References Cited

UNITED STATES PATENTS

| 3,127,489 | 3/1964 | Wallace | 337—140 XR |
| 3,025,373 | 3/1962 | Bullis | 337—123 XR |
| 2,326,239 | 9/1943 | MacLaren | 337—140 |
| 1,923,509 | 9/1933 | Rozumek | 337—123 XR |
| 3,155,796 | 11/1964 | Ellenburger | 337—123 |

FOREIGN PATENTS 385,283 3/1931 Great Britain.

BERNARD A. GILHEANY, Primary Examiner

D. M. MORGAN, Assistant Examiner

U.S. Cl. X.R.

29—622; 337—140, 384